| (12) | United States Patent | (10) Patent No.: | US 9,740,806 B1 |
|---|---|---|---|
| | Terry et al. | (45) Date of Patent: | *Aug. 22, 2017 |

(54) SYSTEM AND METHOD FOR TRANSITIONING BETWEEN EXECUTING MODELS

(71) Applicant: Nationwide Mutual Insurance Company, Columbus, OH (US)

(72) Inventors: Shannon Terry, Upper Arlington, VA (US); Victoria Bondoc, Columbus, OH (US); Benjamin A. Ogorek, Columbus, OH (US)

(73) Assignee: Nationwide Mutual Insurance Company, Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/271,334

(22) Filed: Sep. 21, 2016

Related U.S. Application Data

(63) Continuation of application No. 14/031,364, filed on Sep. 19, 2013, now Pat. No. 9,471,729.

(60) Provisional application No. 61/702,849, filed on Sep. 19, 2012, provisional application No. 61/836,036, filed on Jun. 17, 2013.

(51) Int. Cl.
| G06F 7/60 | (2006.01) |
|---|---|
| G06F 17/10 | (2006.01) |
| G06F 17/50 | (2006.01) |
| G06F 17/11 | (2006.01) |

(52) U.S. Cl.
CPC .......... *G06F 17/5009* (2013.01); *G06F 17/11* (2013.01); *G06F 2217/16* (2013.01)

(58) Field of Classification Search
CPC ........... G06F 17/5009; G06F 17/30289; G06F 17/30345; G06F 17/11; G06F 2217/16; G06Q 10/06
USPC .... 703/2; 717/104, 106, 108, 116, 117, 120, 717/126, 127, 135, 138
See application file for complete search history.

(56) References Cited

U.S. PATENT DOCUMENTS

| 7,761,850 B2 | 7/2010 | Kilian-Kehr |
|---|---|---|
| 8,015,541 B1 | 9/2011 | Srinivasan |
| 2009/0037363 A1 | 2/2009 | Kozlov |

*Primary Examiner* — Eun Kim
(74) *Attorney, Agent, or Firm* — Morgan, Lewis & Bockius LLP

(57) ABSTRACT

Model metadata for each of a plurality of mathematical models is stored. Data describing two sets of models is received. Each of the sets identifies one or more models of the plurality of mathematical models. One of the sets comprises a transition-from set and one of the sets comprises a transition-to set. Data describing a launch date for commencing a transition from executing the model(s) in the transition-from set to executing the model(s) in the transition-to set is received. Data describing a transition period of time for the transition is received. The models in the transition-from set and in the transition-to set are executed during the transition period of time. An output of the execution of the model(s) in the transition-from set is combined with an output of the execution of the model(s) in the transition-to set. The output is stored in a database.

6 Claims, 25 Drawing Sheets

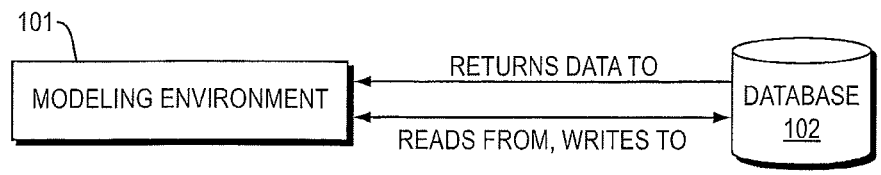
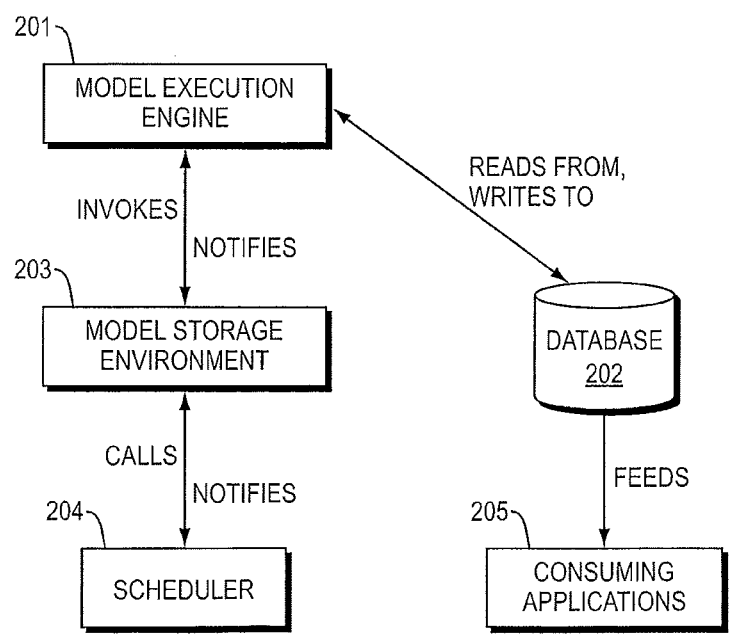
FIG. 1
FIG. 2

CREATE MODEL

MODEL NAME

MODEL DESCRIPTION

MODEL PURPOSE

MODEL AUTHOR

MODEL GROUP

BUSINESS EFFECTIVE START DATE

BUSINESS EFFECTIVE END DATE

MODEL REPOSITORY PATH

STATISTICAL MODELING TOOL

ABSTRACT MODEL

[ CREATE ]

CONSOLE

| MODEL ID | MODEL NAME | MODEL DESCRIPTION | MODEL AUTH | GROUP | START | END |
|---|---|---|---|---|---|---|
| 1234 | MODEL ABC | WHO TO CONTACT | JOE SMITH | GROUP1 | 9/16/12 | 9/17/12 |
| 567 | MODEL XYZ | PRIORITIZATION OF... | JOE SMITH | GROUP1 | 9/17/12 | 9/18/12 |

FIG. 7

TABLE 1

| MODEL ID | MODELNAME | MODELDESCR | MODEL REPOSITORY PATH | MODEL GROUP ID | BUSINESS EFFSTARTDT | BUSINESS EFFENDDT | CURRENTIND |
|---|---|---|---|---|---|---|---|
| 1 | PREMIUM CHANGE NOTIFICATION (PCN) | THIS MODEL SCORES POLICIES WITH AN UPCOMING PREMIUM CHANGE AT RENEWAL. HIGHER SCORES CORRESPOND... | CMA MODELS-> PREMIUM CHANGE | 1 | 11/11/2011 | 6/17/2012 | N |
| 2 | ON YOUR SIDE REVIEW (OYS) | THIS MODEL SCORES POLICIES WITH AN UPCOMING PREMIUM CHANGE AT RENEWAL AS WELL AS P&C HOUSEHOLDS. HIGHER SCORES... | CMA MODELS-> ON YOUR SIDE REVIEW | 2 | 11/11/2011 | 3/9/2012 | N |
| 9 | ON YOUR SIDE REVIEW (OYS) | THIS MODEL SCORES POLICIES WITH AN UPCOMING PREMIUM CHANGE AT RENEWAL AS WELL AS P&C HOUSEHOLDS. HIGHER SCORES... | CMA MODELS-> ON YOUR SIDE REVIEW | 2 | 3/10/2012 | 12/31/5555 | Y |

FIG. 8

TABLE 2

| MODEL_GROUP_ID | MODEL_GROUP_NAME | MODEL_GROUP_DESCR |
|---|---|---|
| 8 | IAQ | INTERNET ABANDONED QUOTE |
| 2 | OYS | ON YOUR SIDE REVIEW |
| 1 | PCN | PREMIUM CHANGE NOTIFICATION |

FIG. 9

TABLE 3

| SERVER_NAME | CIB_NAME | SCHEDULE_START_DT | CREATE_DTTM | CURRENT_LOAD_DT | START_DTTM | END_DTTM | STATUS |
|---|---|---|---|---|---|---|---|
| serverID | GDW_SPSS_MDL_OYS | 3/10/2012 | 3/10/2012 3:00 AM | 3/10/2012 | 3/10/2012 3:00 AM | | R |

FIG. 10

TABLE 4

| MODEL_INSTANCE_ID | ANLTC_HS LD_ID | BUSINESS_EVENT | MODEL_OUTPUT _TYPE_ID | BUSINESS_ EVENT_DT | MODEL_OUTPUT_VALUE |
|---|---|---|---|---|---|
| 20120310030017-370-AC18A82D-116724 | 100001 | POLICY RENEWAL | 1 | 3/21/2012 | 0.039967 |
| 20120310030017-370-AC18A82D-116724 | 100001 | POLICY RENEWAL | 4 | 3/21/2012 | 14 |
| 20120310030017-370-AC18A82D-116724 | 100002 | POLICY RENEWAL | 1 | 4/21/2012 | 0.00445 |
| 20120310030017-370-AC18A82D-116724 | 100002 | POLICY RENEWAL | 4 | 4/21/2012 | 35 |
| 20120310030017-370-AC18A82D-116724 | 100003 | POLICY RENEWAL | 1 | 3/16/2012 | 0.169721 |
| 20120310030017-370-AC18A82D-116724 | 100003 | POLICY RENEWAL | 4 | 3/16/2012 | 1 |
| 20120310030017-370-AC18A82D-116724 | 100004 | POLICY RENEWAL | 1 | 4/1/2012 | -0.008214 |
| 20120310030017-370-AC18A82D-116724 | 100004 | POLICY RENEWAL | 4 | 4/1/2012 | 49 |
| 20120310030017-370-AC18A82D-116724 | 100005 | POLICY RENEWAL | 1 | 5/13/2012 | -0.004947 |
| 20120310030017-370-AC18A82D-116724 | 100005 | POLICY RENEWAL | 4 | 5/13/2012 | 48 |

FIG. 11

TABLE 5

| SERVER_NAME | CIB_NAME | SCHEDULE_START_DT | CREATE_DTTM | CURRENT_LOAD_DT | START_DTTM | END_DTTM | STATUS |
|---|---|---|---|---|---|---|---|
| serverID | GDW_SPSS_MDL_OYS | 3/10/2012 | 3/10/2012 3:00 AM | 3/10/2012 | 3/10/2012 3:00 AM | 3/10/2012 3:04 AM | C |

FIG. 12

TABLE 6

| SERVER_NAME | CIB_NAME | SCHEDULE_START_DT | CREATE_DTTM | CURRENT_LOAD_DT | START_DTTM | END_DTTM | STATUS |
|---|---|---|---|---|---|---|---|
| serverID | GDW_SPSS_MDL_OYS | 3/10/2012 | 3/10/2012 3:00 AM | 3/10/2012 | 3/10/2012 3:00 AM | 3/10/2012 3:04 AM | C |
| serverID | GDW_SPSS_MDL_OYS | 3/12/2012 | 3/12/2012 3:00 AM | 3/12/2012 | 3/12/2012 3:00 AM | 3/10/2012 3:03 AM | C |
| serverID | GDW_SPSS_MDL_OYS | 3/13/2012 | 3/13/2012 3:00 AM | 3/13/2012 | 3/13/2012 3:00 AM | 3/10/2012 3:07 AM | C |
| serverID | GDW_SPSS_MDL_OYS | 3/14/2012 | 3/14/2012 3:00 AM | 3/14/2012 | 3/14/2012 3:00 AM | 3/10/2012 3:06 AM | C |

FIG. 13

SYSTEM AND METHOD FOR TRANSITIONING BETWEEN EXECUTING MODELS

CROSS REFERENCE TO RELATED APPLICATIONS

This application is a continuation of U.S. patent application Ser. No. 14/031,364 filed Sep. 19, 2013, now U.S. Pat. No. 9,471,729, which claims the benefit of U.S. Provisional Patent Application Nos. 61/702,849, filed Sep. 19, 2012, and 61/836,036, filed Jun. 17, 2013, all of which are hereby incorporated by reference in their entireties.

TECHNICAL FIELD

This invention relates to transitioning between executing mathematical models.

SUMMARY

The present invention relates to a computer implemented method, a system and a computer readable medium storing instructions which, when executed by a computer cause the computer to perform the described method. Model metadata for each of a plurality of mathematical models is stored. Data describing two sets of models is received. Each of the sets identifies one or more models of the plurality of mathematical models. One of the sets comprises a transition-from set and one of the sets comprises a transition-to set. Data describing a launch date for commencing a transition from executing the model(s) in the transition-from set to executing the model(s) in the transition-to set is received. Data describing a transition period of time for the transition is received. The models in the transition-from set and in the transition-to set are executed during the transition period of time. An output of the execution of the model(s) in the transition-from set is combined with an output of the execution of the model(s) in the transition-to set. The output is stored in a database.

BRIEF DESCRIPTION OF THE DRAWINGS

The foregoing summary, as well as the following detailed description of various embodiments, will be better understood when read in conjunction with the appended drawings. It should be understood, however, that the invention is not limited to the precise arrangements and instrumentalities shown.

FIG. 1 illustrates the exemplary context in which an embodiment of the invention may be used;

FIG. 2 illustrates the components of a production model execution environment in accordance with one embodiment of the invention;

FIG. 7 is an exemplary user interface that may be used for entering data associated with a model, in connection with an embodiment of the present invention;

FIGS. 8-13 are tables illustrating model data/meta data generated in accordance with an exemplary implementation of the present invention.

DETAILED DESCRIPTION

Figure 3A:
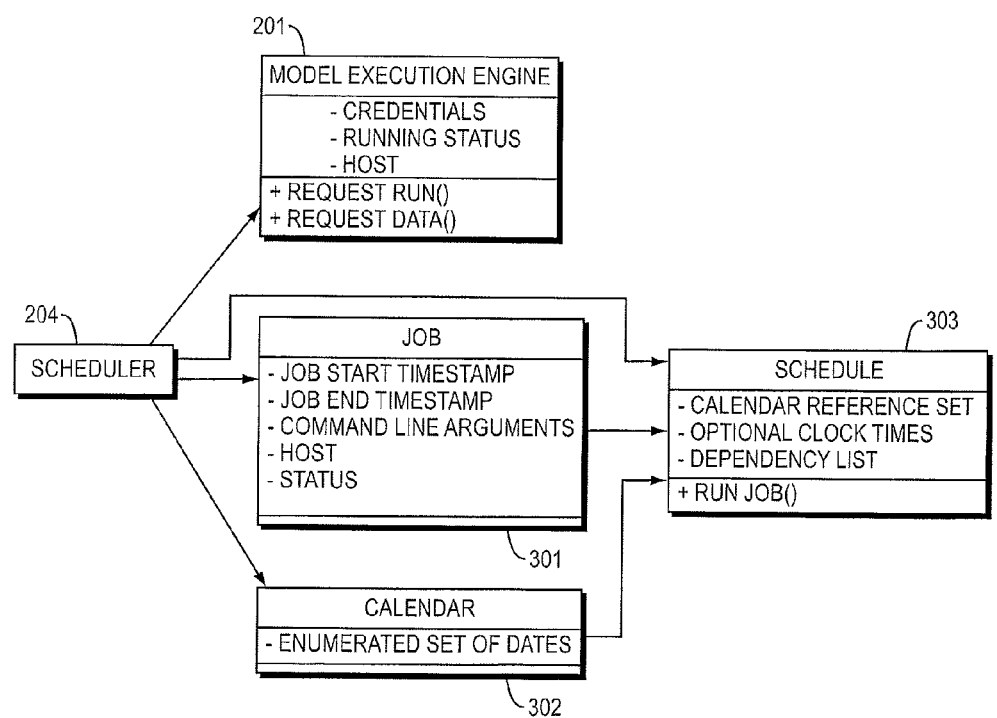
FIG. 3A is a diagram of an exemplary scheduler in accordance with an embodiment of the present invention.

The systems and method described herein relate to predictive and descriptive modeling systems. More specifically, the systems and methods pertain to the creation, storage, retrieval, and maintenance of data and metadata in predictive and descriptive modeling systems. The system creates and maintains model metadata, model executions, and their resulting model outputs. Methods for capturing, classifying, and documenting model inputs and outputs are also provided. The apparatus supports mapping physical or logical structures in a database system via a system catalog to a model for the purpose of defining model inputs. These inputs can be used in a one-to-one mapping or as part of a defined usage context (e.g., a derived field such as an indicator or calculated metric) that may utilize multiple fields or even other mappings. A flexible storage solution may also be provided, which eliminates the need for structural database changes for the deployment of new or updated models. This leads to significant savings of time and money. These structures also facilitate retrieval and ensure consistent application integration via a standard table-based interface. Additionally, the model instance may provide an audit trail including the user, server, server network address, system process identifier, and timestamp for the execution. Outputs from a model execution are tagged with the corresponding model instance identifier, which allows analysts to see the history of models and their scores over time without ambiguity.

Aspects of the present invention provide for a centralized predictive knowledge repository, which contains the sum of an enterprise's predictive experience. Previously, this knowledge was tacit, existing in the minds of employees or scattered about network drives in unstructured documents and computer code. Consistency and structure are provided by embodiments of the invention. In particular, regardless of the type of predictive model used, or the inputs or outputs of model, the model metadata and model outputs are stored and managed. Previously, ad-hoc database structures had to be built for new models. Among the other advantages to this structural consistency is that applications consuming the model outputs have a standardized method of retrieval. No matter how the underlying predictive model changes, the retrieval of outputs remains consistent. This is advantageous because it reduces development time and deployment cost, and increases speed to market.

Some aspects of the present invention provide real-time operating ability, in terms of optimized score management processes, output structure and accessibility.

As a knowledge repository, the process starts when the modeler enters data into an application via, for example, a web-based user interface. Once entered, model information is available to the enterprise and linked to the outputs produced by each model. Information that may be captured includes the predictive technique, the model author, and the data used as inputs to the models.

Regardless of the modeler's inputs describing the predictive model, every new model is assigned a model identifier, or Model_Id, that uniquely identifies the model. Models built for a related purpose are also assigned a Model_Group_Id. Start and end dates determine a predictive model's lifetime. An identification strategy such as this one is key to enabling effective consumption of the resulting model scores and measuring effectiveness.

Every time the model runs, an instance identifier is created, called the Model_Instance_Id, which directly precedes the execution of the model. A creation date-time is logged and a status field is set to "R" (running). A user can view the data at this time, observe that a particular model is running, find out on what server it is running on, and view other completed instances to understand how long the model will take to finish. If the model completes successfully, the instance record is updated and the status field is reset to "C" (complete). A communication may be sent to interested parties upon completion of the model execution.

When a model successfully operates, its outputs are stored in the application and are retrievable using Model_Instance_Id as a key. This allows for analytic evaluation of a model's scores over time, and ultimately its historical performance. Application layers (e.g., views or semantic layers) store the most recent scores in a format convenient to consuming software applications, which greatly improves the performance of consuming applications, particularly when large data volumes are involved.

FIG. 1 illustrates the context in which embodiments of the invention may be used. In particular, the context is one in which modeling environment 101 is functionally dependent on a database 102, both reading data from and writing data back to the database 102. FIG. 2 illustrates components of an exemplary production model execution environment, with functional dependencies noted. Thus, FIG. 2 expands on FIG. 1 by showing how a production modeling environment may consist of scheduling and storage components, as well as an execution engine. Thus, FIG. 2 shows that the model execution engine 201 may read and write to a database 202. It may also invoke models from the model storage environment 203, and receive notifications from the model storage environment 203. The model storage environment 203 may call the scheduler 204 and receive notifications from the same. The database 202 feeds data to consuming applications 205.

Figure 3B:
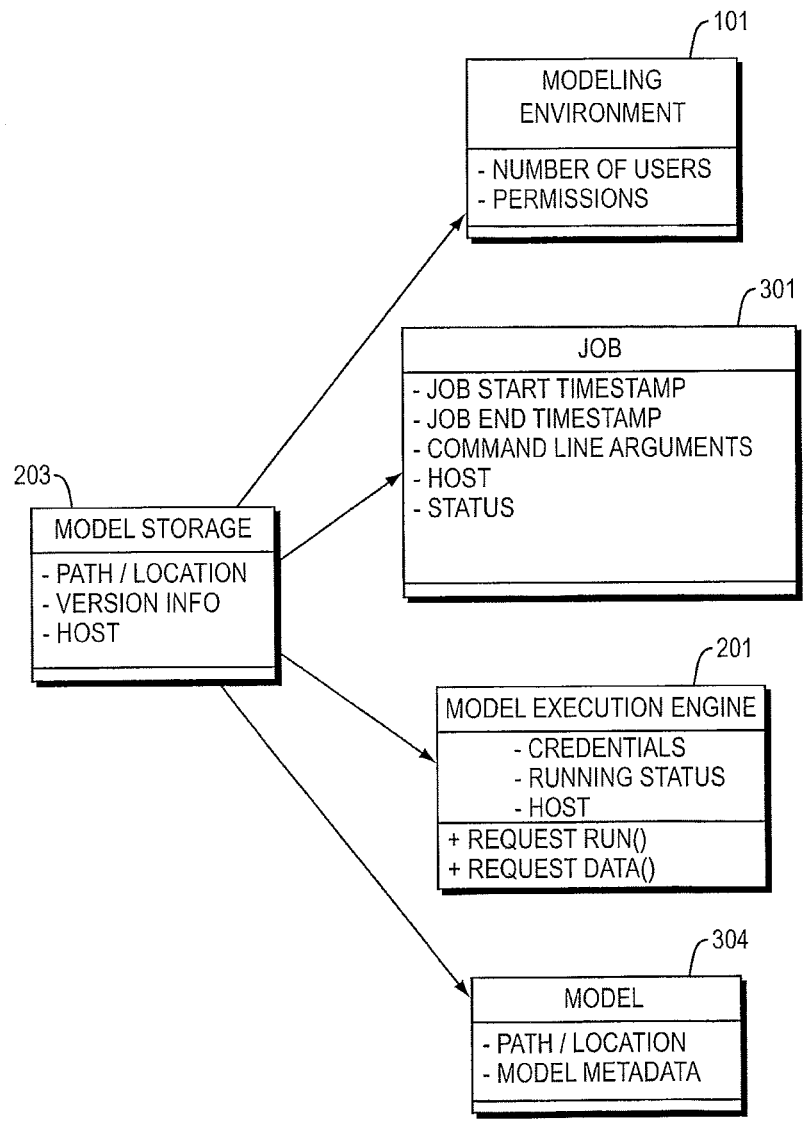
FIG. 3B is a diagram of exemplary components of the model storage system in accordance with an embodiment of the present invention.

FIG. 3A and FIG. 3B each illustrate the dependencies of the scheduler 204 and the model storage system 203, which components are integral to an enterprise-class statistical modeling environment 101. In particular, FIG. 3A is a diagram illustrating a production grade scheduler 204 and its dependencies (i.e., model execution engine 201; job 301; and calendar 302; some of which invoke schedule 303), in accordance with an exemplary embodiment. FIG. 3B is a diagram illustrating the components of model storage system 203 and their dependencies (modeling environment 101; job 301; model execution engine 201; and model 304), in accordance with an exemplary embodiment.

Figure 3C:
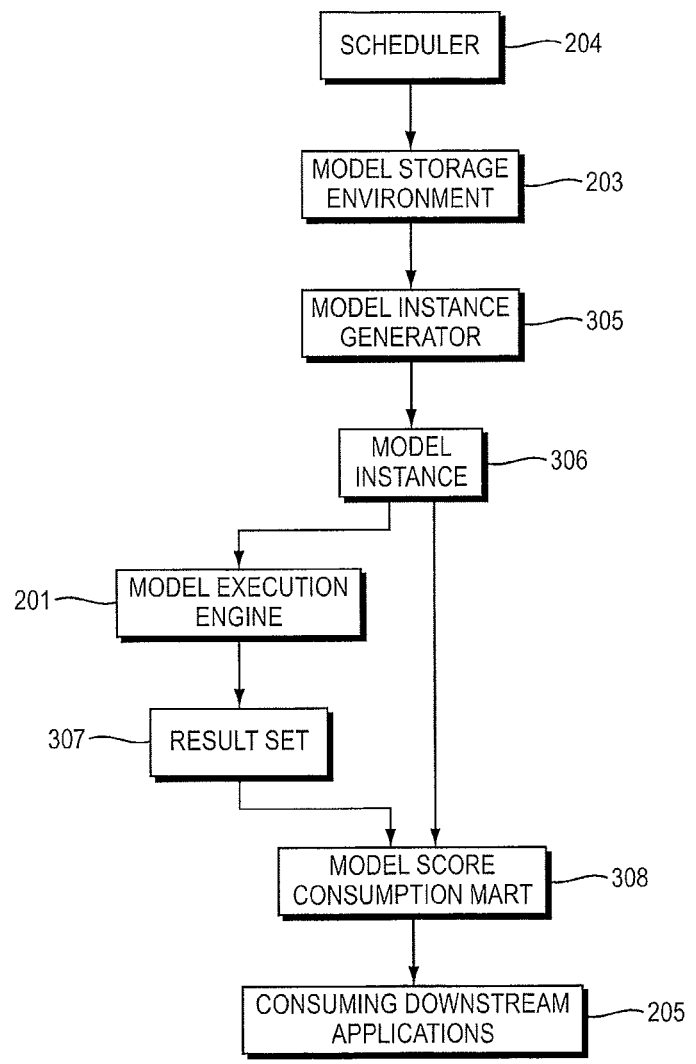
FIG. 3C illustrates an exemplary flow of the proposed modeling environment, which uses the components shown in FIG. 3A and FIG. 3B, in accordance with an embodiment of the present invention.

FIG. 3C is a diagram illustrating an overview of which components within the modeling environment are invoked in connection with the processes described herein. This exemplary flow refers to the basic components shown in FIG. 3A and FIG. 3B, as well as other components. Basically, the scheduler 204 is invoked and contacts the model storage host 203, which obtains the model metadata. The model instance generator 305 generates a model instance 306 which is used to track the execution of the model (model execution engine 201) and the result set 307 of execution. The result set 307 is stored in model score consumption mart 308, where it can be used by downstream applications 205.

Figure 3D:
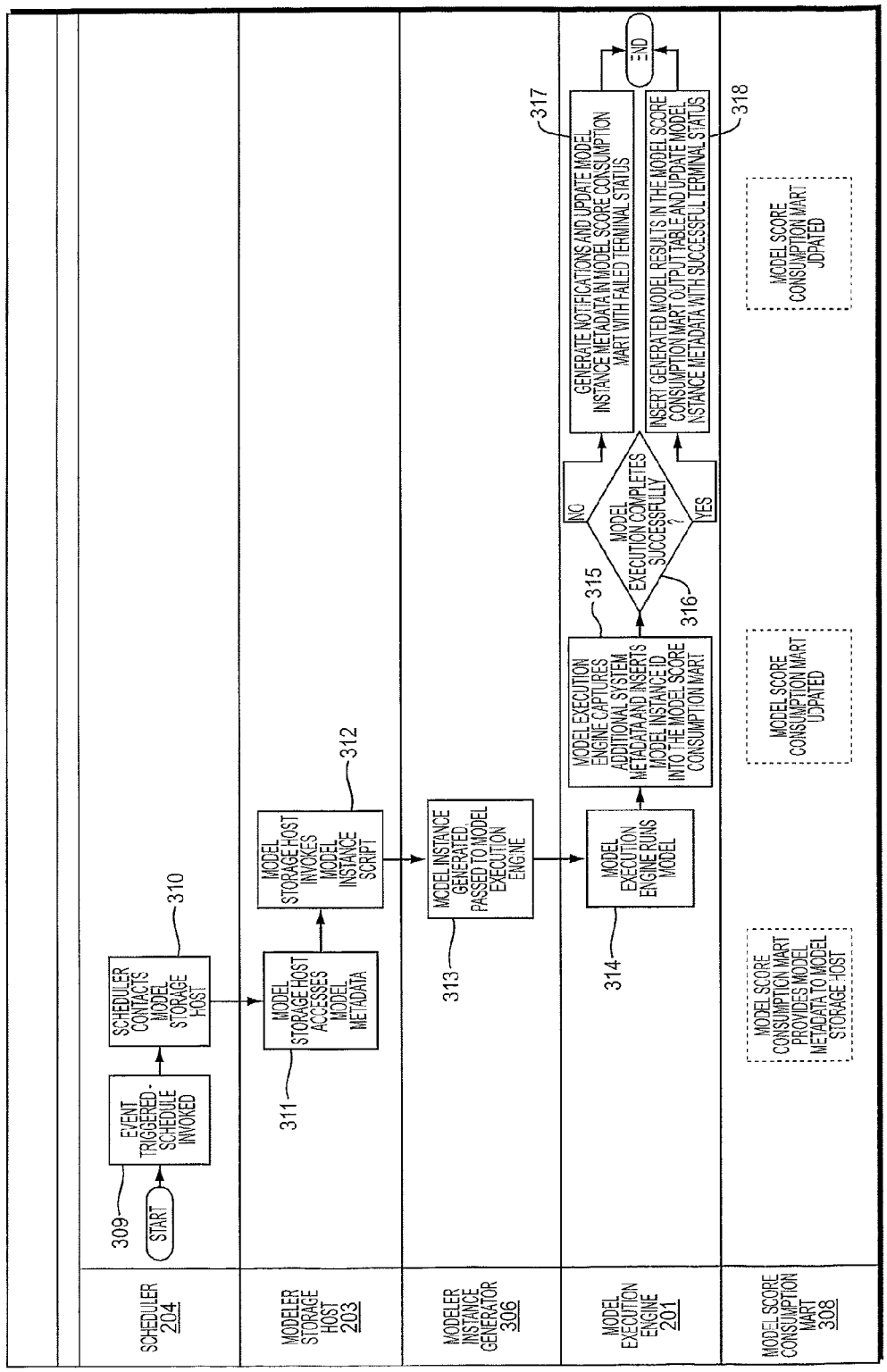
FIG. 3D is a flowchart illustrating the process outlined in FIG. 3C.

FIG. 3D is a more detailed flowchart further illustrating the process outlined in FIG. 3C. In particular, FIG. 3C introduces two solution-specific components, the model instance generator 305 and the model score consumption mart 308 which are used in connection with an embodiment of the present invention. FIG. 3D illustrates the sequence in which these components are active in the process, in an exemplary embodiment. With reference to FIG. 3D, upon the occurrence of a trigger event, schedule 204 is invoked, in step 309. In step 310, the scheduler contacts the model storage host 203. In step 311, the model storage host 203 access model metadata from the model score consumption mart 308. In step 312, the model storage host 312 invokes the model instance script. In step 313, the model instance generator 306 generates the model instance and passes it to the model execution engine 201. In step 314, the model execution engine 201 runs the model. In step 315, the model execution engine 201 captures additional system metadata and inserts the model instance identifier into the model score consumption mart 308. In step 316, it is determined whether the model execution completed successfully. If not, in step 317, notifications are generated and the model instance metadata in the model score consumption mart 308 is updated with failed terminal status. If so, in step 318, the generated model results are inserted in the model score consumption mart 308 output table. Also, the model instance metadata is updated with successful terminal status. The model instance generator 305 and the model score consumption mart 308 comprise the apparatus for executing predictive and descriptive models, whose main features and components are described below.

Model Instance

Figure 4A:
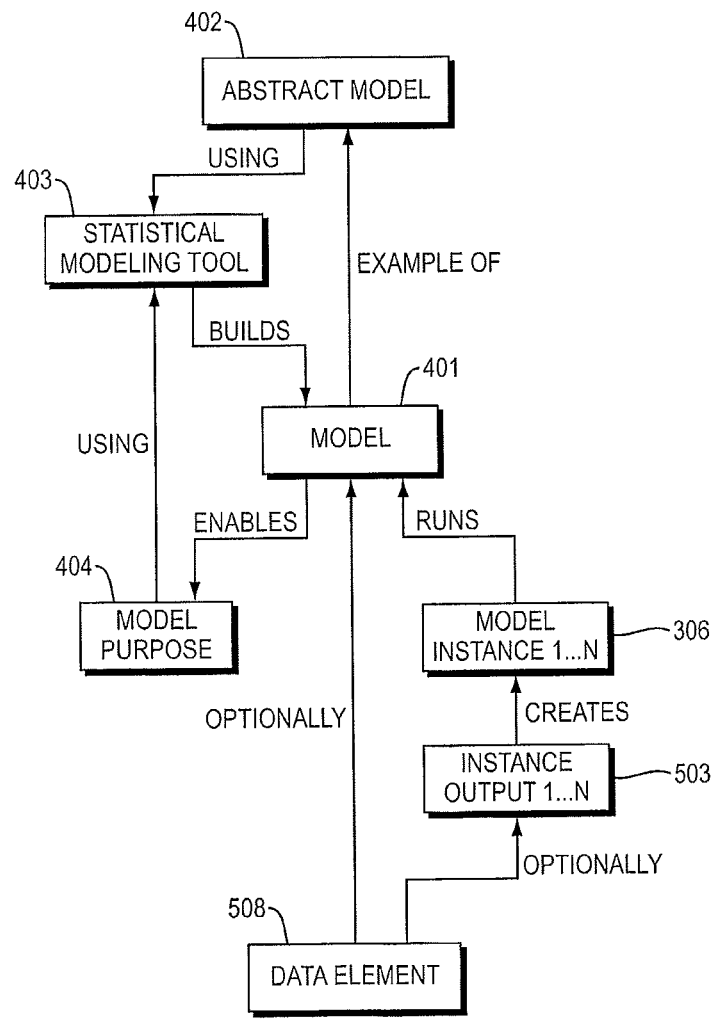
FIG. 4A is an exemplary entity-relationship model of statistical models and their executions, that may be used in connection with an embodiment of the present invention.
Figure 4B:
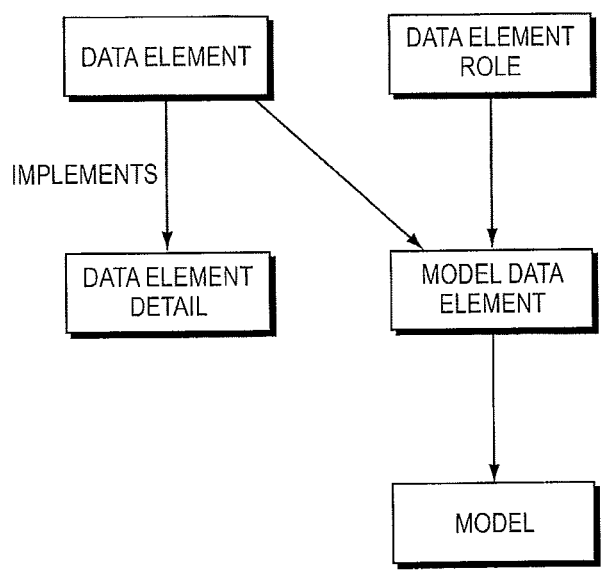
FIG. 4B is an exemplary entity-relationship model describing how the statistical model relates to data within a database, that may be used in connection with an embodiment of the present invention.

The relationship between the statistical model and the application of the model to data is referred to herein as an "instance," or "model instance." FIG. 4A depicts an entity-relationship model of statistical models and how they relate to their instances. Every run of a model creates an instance; one instance may be related to a variety of analytic units and outputs, and many instances may be created over a model's service lifetime. FIG. 4B also illustrates an entity-relationship model but further describes how the statistical model relates to data within a database. Each data element is associated with details and, because a data element may be involved with multiple models, data elements are associated with roles for a particular model, as described in more detail below.

Figure 5A:
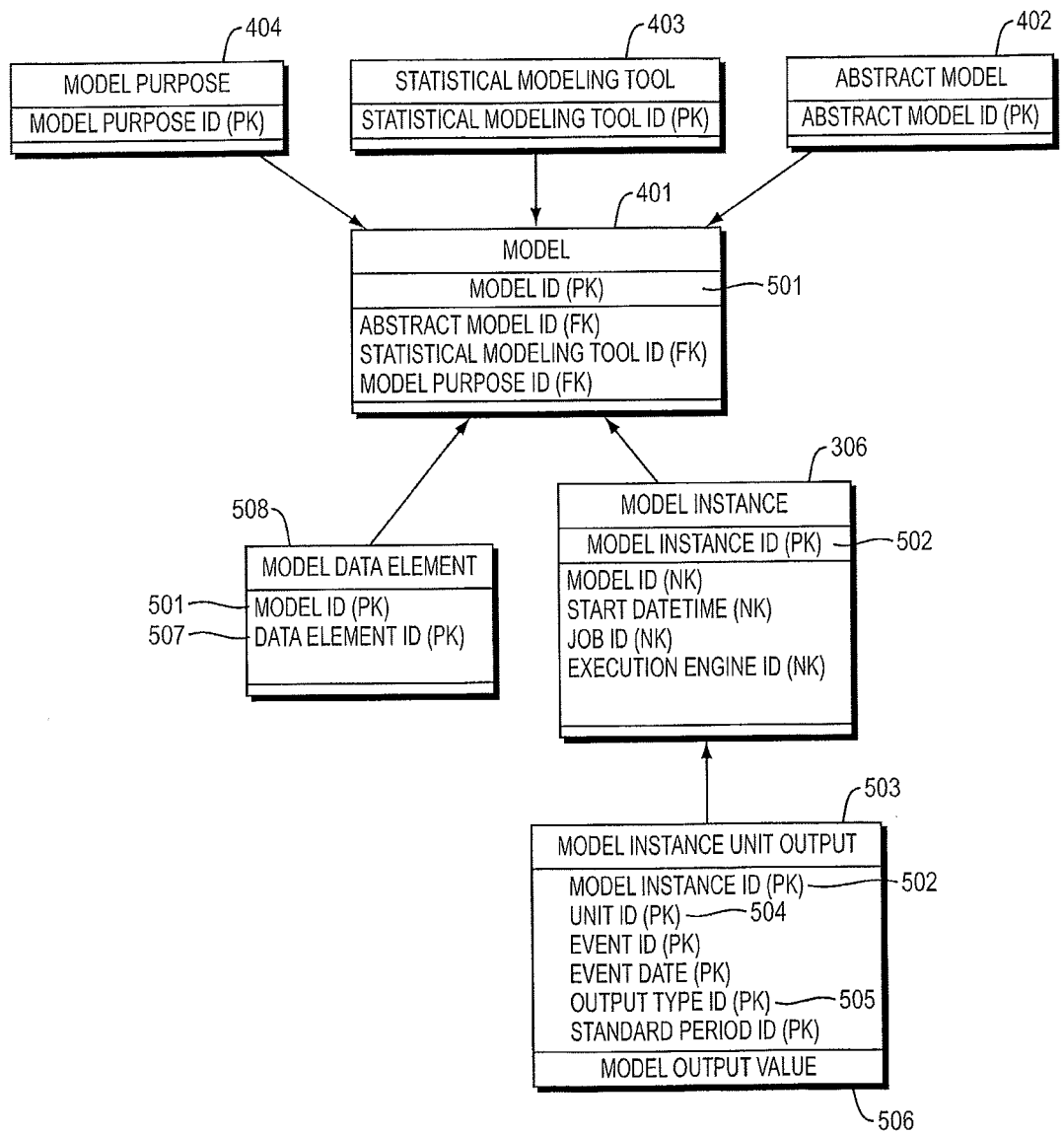
FIG. 5A is a logical data model that may be used in connection with an embodiment of the present invention.

FIG. 5A is a logical data model showing certain (i.e., primary, foreign, and natural) keys for the entity-relationship model of statistical models and their executions. For simplicity, this illustration does not include the model data. A model is uniquely determined by its Model Identifier (Model Id 501). A Model Instance 306, on the other hand, is uniquely determined by the Model Id 501 in combination with a start datetime, a Job Id, and an Execution Engine Id. Here, job refers to the batch program running the model on the execution engine.

To facilitate querying of a particular model instance from the database, the surrogate key Model Instance Id 502 is created. It is designed in such a way that all elements of the natural key (Model Id 501, Start Datetime, Job Id, and Execution Engine Id) may be extracted through parsing the field itself, accomplished through an encoding based on the hexadecimal system.

Model Outputs

The purpose of running a predictive or descriptive statistical model, i.e., creating a Model Instance 306, is to generate outputs that in some way describe an analytic unit of interest. FIG. 4A shows how a Model Instance 306 relates to its outputs. The instance may create many output records, but each output record was created from one and only one Model Instance 306. In the entity-relationship modeling context, a Model Instance Unit Output 503 is represented, where "Unit" stands for a particular subtype of Model Instance Output. Model Instance Unit Output 503 is referred to herein, where abstract units are identified with the attribute "Unit ID" 504.

Figure 5B:
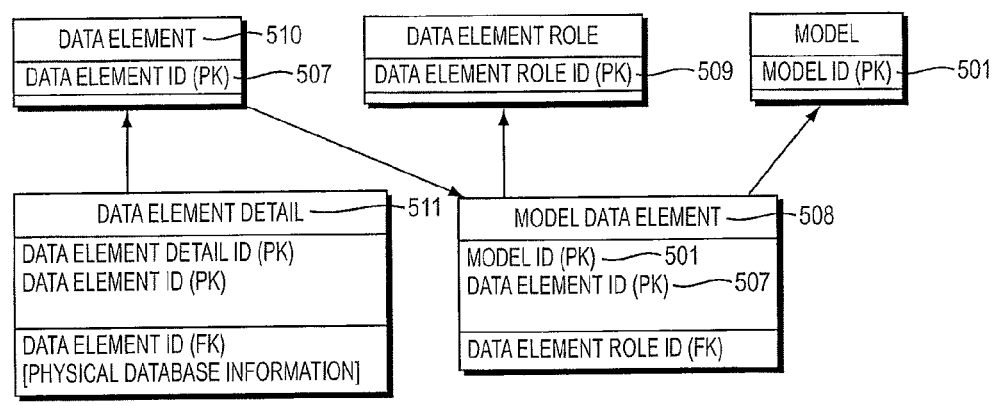
FIG. 5B is a logical data model that may be used in connection with an embodiment of the present invention.

FIG. 5A shows the primary and foreign keys related to the Model Instance Unit Output 503 relation. The Model Instance ID 502 is a component of the key, whereas other components necessary for uniqueness include the unit identifier (Unit ID) 504 and the type of output (Output Type Id 505). FIG. 5B is a logical data model showing certain (i.e., primary, foreign, and natural) keys for the entity-relationship model describing how the statistical model relates to data within a database.

Referring back to FIG. 5A, other contextual information includes Event ID and Event Date. Models are run for a reason. Thus, it is assumed that every event type of interest has a corresponding unique identifier—an Event Id. Because some events are recurring (e.g., an "event" may be a monthly scoring), the event date is an important part of the context. An additional contextual field, "Standard Period Id," includes information on the business relevant time period or frequency.

An attribute of interest in the Model Instance Unit Output 503 relation is the Model Output Value 506. This field contains the outputs of models which in some way describe or make a prediction about the unit of interest (hence, the phrase "predictive and descriptive models").

Model Data

Referring back to FIGS. 4A and 4B, the manner in which a model relates to its data is illustrated. Multiple models may use a particular data element, implying a many-to-many relationship between the Model and the Data Element entities. To remedy this, an associative entity called Model Data Element is created. This entity serves a purpose—one model's predictor may be another model's target of prediction. The Data Element Role entity, functionally related to Model Data Element, indicates the context of the data element in a particular model.

Focusing on the data element, without the context of the model, is the Data Element entity. An important non-key attribute of the Data Element relation is the Data Element Derived Indicator, which indicates whether additional transformations have been applied to database columns to create the data element. If this indicator is false (or 0), then the field is a direct mapping from a column in a physical database to a data element that can be used in a predictive or descriptive model. If the indicator is true (or 1), then some transformation has been applied to a column or columns from the database. In the case that multiple variables are involved, there is a one-to-many relationship between Data Element and the relation Data Element Detail, which includes all the physical database columns used in the creation of the data element. The exact nature of the transformation is not currently specified.

FIG. 5A shows the primary and foreign keys related to the model data component of the Model Score Consumption Mart. The Model relation has one foreign key and unique identifier, Model Id 501, which is paired with the data element identifier, Data Element Id 507, to form the primary key of the Model Data Element table 508. Referring to FIG. 5B, the foreign key within this relation, Data Element Role Id 509, is the unique primary key in the entity, Data Element Role, which provides categorical information about the nature of the data element in the context of the model. Every data element in the Model Data Element 508 relation is also necessarily represented in the Data Element 510 relation, with Data Element Id 507 as the unique primary key.

The primary key of Data Element 510, Data Element Id 507, is also contained in the relation Data Element Detail 511. Since multiple database columns can be used to create a data element, there is a one-to-many relationship here, yet Data Element Id 507 is foreign key rather than a primary key in the Data Element Detail 511 relation. This is because the database column identifier Data Element Detail Id is sufficient to ensure uniqueness and identifiability of all database columns.

Model Metadata

In addition to the production aspects of this apparatus and method for executing predictive and descriptive models, the Model Score Consumption Mart 308 in particular provides a way to document and store metadata about models.

Referring to FIG. 4A, the Model entity 401 has a one to one relationship between the Abstract Model entity 402, the Statistical Modeling Tool entity 403, and the Model Purpose 404 entity.

As shown in FIG. 5A, the primary keys in these entities are all foreign keys in the Model entity 401. The data from the Abstract Model entity 402 is meant to give the analyst an idea of the technique that the predictive or descriptive model was based on. For example, a decision tree-based model will have a different output score distribution than a regression model with continuous predictors; the Abstract Model entity 402 is designed to provide a quick glimpse into the type of model in question. The Statistical Modeling Tool entity 403 provides information about what software was used to estimate the model. Because models are built for many purposes, with descriptive and predictive as two generic categories, the Model Purpose entity 404 is meant to answer the question of why the model was built.

Figure 6A:
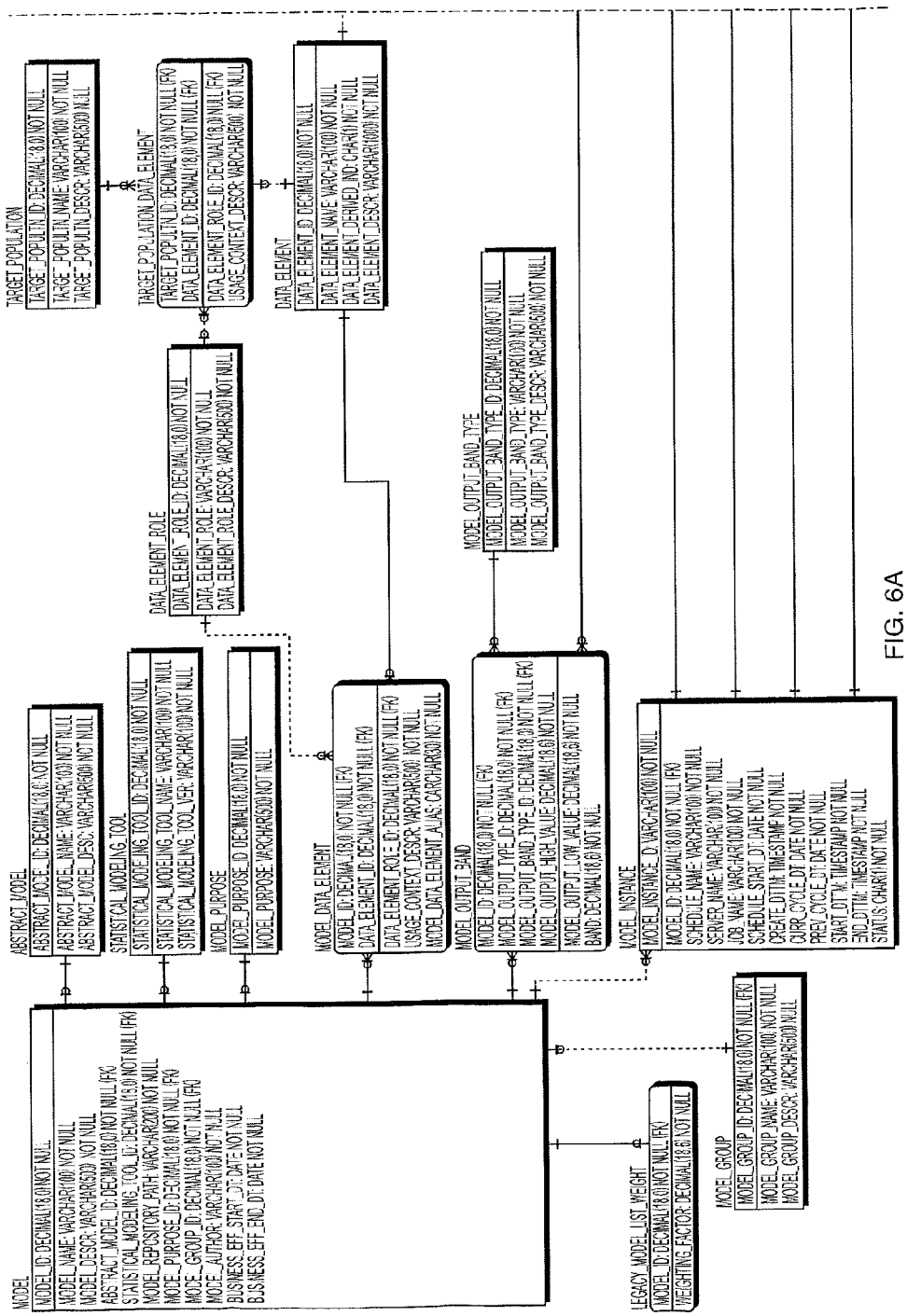
FIGS. 6A and 6B together show an exemplary implementation of a data model that may be used in connection with an embodiment of the present invention.
Figure 6B:
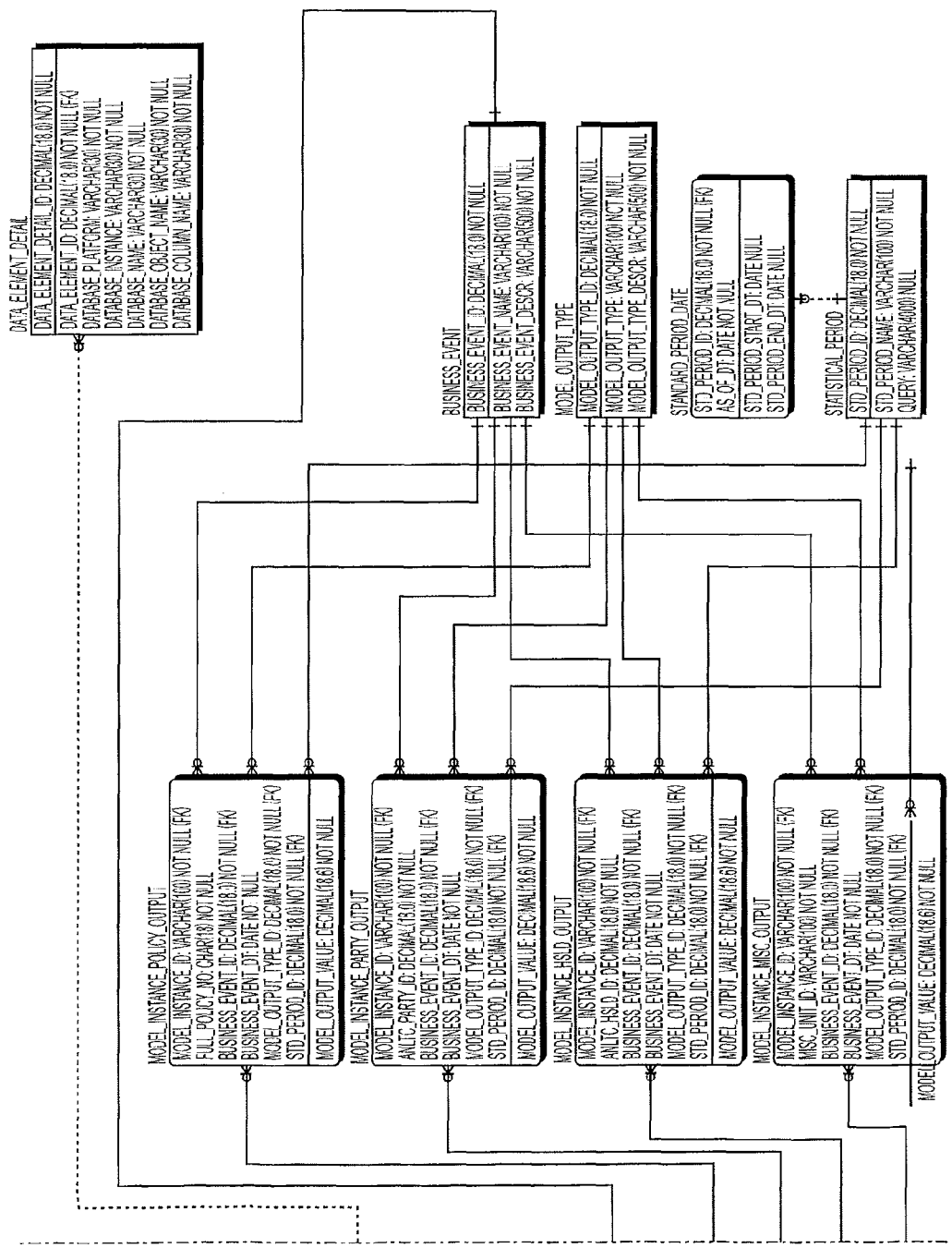

FIGS. 6A and 6B together show an exemplary physical database schematic of the application component of the apparatus. Such a database model is physically instantiated in a production database that is accessible to consuming applications 205.

To facilitate the entry of model metadata into the application, software applications featuring user interfaces may be used. FIG. 7 is an exemplary user interface that may be used in connection with the application for entering model metadata.

The following provides an example of how the systems and methods described herein can be used in connection with a business process referred to herein as OYSR. By way of background, the OYSR model maps a numerical score to customer households with an impending insurance policy renewal, where higher scores correspond to a higher likelihood of a beneficial effect when the proactive activity related to the policy is carried out by an agent. The OYSR model runs nightly, and customer households are scored by the model when an auto or property insurance policy within the household is near renewal.

In the company's predictive modeling environment, in this example, a first iteration of the OYSR model has been running since Nov. 11, 2011. On Mar. 10, 2012, the model is to be replaced with an update built using more recent data. The below describes the implementation using the apparatus described herein and a first run of the model. Note that, in this example, only features of the apparatus necessary to illustrate functionality are described, and certain other metadata fields are omitted.

Before the First Execution

As future executions depend upon the independent entry in the Model table, its information is described first. This information is entered using a user interface, e.g., as in FIG. 7, prior to the first execution of the model. In Table 1 (shown in FIG. 8), note that the updated OYSR model has been assigned Model_Id=9, whereas the previous model edition had been previously assigned Model_Id=2. On the other hand, both models fall under Model_Group_Id=2. Thus the history of the OYSR modeling initiative may be traced back using this field. Previous to the first OYSR model (Model_Id=2) being built, the Model Group information seen in Table 2 (shown in FIG. 9) would have had been filled out.

When a business configuration manager fills enters information about the OYSR model update (Model_Id=9), he sets the business effective dates so that the new model begins on a desired future date, in this case Mar. 10, 2012.

The model has been built with a language that the Model Execution Engine 201 can parse and process. This code is stored in the location specified by Model Storage Path (See FIG. 3B). This path also includes a schedule in which the model will run.

After the business effective start date of Mar. 10, 2012, stored in the Model entity (Table 2), the scheduler follows a previously defined schedule, GDW_SPSS_DLY, stored in the Model Storage Path and named in the Model Instance entity 306 (see also Table 3, FIG. 10). In this example, on Mar. 10, 2012, at 3:00 AM, the schedule is called and the scheduler is invoked, running the job GDW_SPSS_MDL_OYS. This job contacts the Model Storage Host, which collects metadata from the Model table and uses information in the repository to generate a Model Instance Id 502, in this case the string, "20120310030017-370-AC18A82D-116724." A secure encrypted copy of the Model Instance Id 502 is passed to the Model Execution Engine 201, serverID, and the Model Execution Engine 201 inserts a record into the Model Instance Table, as seen in Table 3. This includes the start timestamp of the Model Execution Engine (CREATE_DTTM) as well as that of the initial database insert (START_DTTM). Since the execution has not completed, the field END_DTTM field is left null and the Status is set to the code "R," for "running." At this time, the Model Execution Engine 201 runs the OYSR model code as stored in the Model Storage Path. The OYSR model includes business logic that queries the database for customer households with policy renewals in the near future (45 days or less). The logic also includes retrieves data elements, e.g. customer tenure, and uses these data elements in a mathematical equation to create a propensity score.

The scores themselves are stored in the Model Instance Household Output entity and given MODEL_OUTPUT_TYPE_ID=1, as shown in Table 4, shown in FIG. 11. Scores of this type are associated with the effectiveness of OYSR activities. In addition to the raw model score, a business friendly score is also given, with Model_Output_Type_Id=4. Thus, each of the sample households is associated with two rows instead of one. Finally, the Business Event for the OYSR activity is a policy renewal, and the Business Event date is defined to be the policy renewal date.

After all households are scored, the Model Execution Engine 201 writes the final timestamp END_DTTM in the Model Instance table, as well as updating the status to "C" for complete, as shown in Table 5, FIG. 12. Messages are sent out indicating a successful completion, and consuming applications may now retrieve scores from the Model_Instance_Hsld_Output table, or one of the views in the application layer of the Model Score Consumption Mart 308.

The model will continue to run as defined by the schedule in the Model Storage Host. Table 6 (FIG. 13) shows the Model Instance entity after the updated OYSR model has run multiple times.

Figure 14:
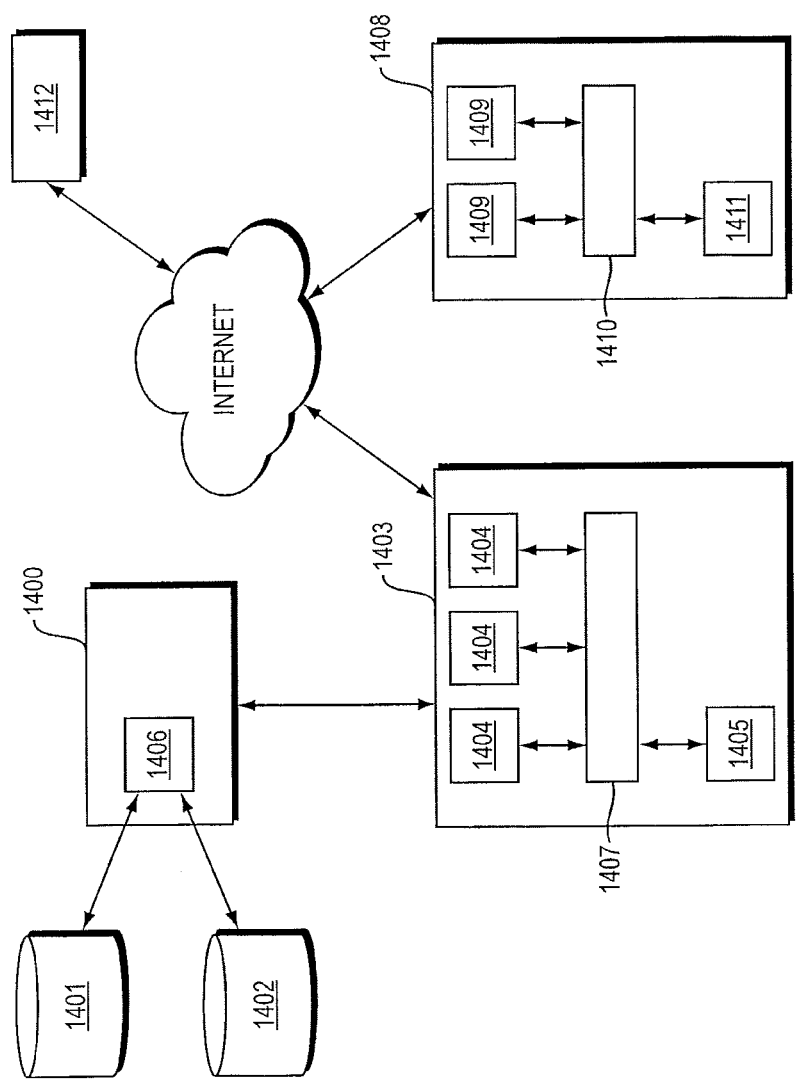
FIG. 14 is a diagram illustrating an exemplary system for carrying out the methods of the present invention.

Exemplary hardware and software employed by the systems are now generally described with reference to FIG. 14. Database server(s) 1400 may include a database services management application 1406 that manages storage and retrieval of data from the database(s) 1401, 1402. The databases may be relational databases; however, other data organizational structure may be used without departing from the scope of the present invention. One or more application server(s) 1403 are in communication with the database server 800. The application server 1403 communicates requests for data to the database server 1400. The database server 1400 retrieves the requested data. The application server 1403 may also send data to the database server for storage in the database(s) 1401, 1402. The application server 1403 comprises one or more processors 1404, computer readable storage media 1405 that store programs (computer readable instructions) for execution by the processor(s), and an interface 1407 between the processor(s) 1404 and computer readable storage media 1405. The application server may store the computer programs referred to herein.

To the extent data and information is communicated over the Internet, one or more Internet servers 808 may be employed. The Internet server 1408 also comprises one or more processors 1409, computer readable storage media 1411 that store programs (computer readable instructions) for execution by the processor(s) 1409, and an interface 1410 between the processor(s) 1409 and computer readable storage media 1411. The Internet server 1408 is employed to deliver content that can be accessed through the communications network, e.g., by end user 1412. When data is requested through an application, such as an Internet browser, the Internet server 1408 receives and processes the request. The Internet server 1408 sends the data or application requested along with user interface instructions for displaying a user interface.

The computers referenced herein are specially programmed to perform the functionality described herein as performed by the software programs.

The non-transitory computer readable storage media may include volatile and non-volatile, removable and non-removable media implemented in any method or technology for storage of information such as computer-readable instructions, data structures, program modules, or other data. Computer readable storage media may include, but is not limited to, RAM, ROM, Erasable Programmable ROM (EPROM), Electrically Erasable Programmable ROM (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computer system.

Now described are systems and methods in which transitioning from one or more executing models to one or more other executing model can be achieved. In particular, the systems and methods relate to model repository systems and more particularly to facilitating transitions between sets of predictive and/or descriptive models.

The methods and systems provide the ability to facilitate a variety of model transitions, allowing for the control and direction of the transition from one or more active models to one or more other models or to transition from one or more active models to a combination consisting of one or more of the same models and one or more other models. Some embodiments allow for real-time operating ability, providing for optimal proactive or reactive predictive and descriptive model transitions. Some embodiments also provide the ability to facilitate model transitions regardless of the reasons for the transitions. Some embodiments provide the ability to facilitate multiple transitions independently from one another. This ensures complete and consistent operation even in complex model repositories and operating environments.

As described herein, a launch event can be specified. The launch date indicates a future date (and optionally time) that the transition between one or more models to one or more different models should begin. This allows transitions to be scheduled to begin immediately or at any time in the future.

A transition window can be specified. This may be expressed in standard units of time over which the entirety of the model transition should occur. A transition commences at the specified launch event and concludes once the transition window has fully elapsed.

Passive and active transitions can be initiated by the system. Passive transitions rely on the normal operation of a scheduler to make the calls to a model storage environment that will in turn invoke the model execution engine. Active transitions can begin the transition immediately by bypassing the scheduler and calling the model storage environment directly to invoke the model execution engine.

The systems and methods involve the use of a model repository or similar model operating and storage environments, direct or indirect access to instruct a model execution engine to invoke the execution of predictive and descriptive models, and interaction with underlying information structures to store and retrieve metadata.

The system captures and maintains metadata for model transitions and facilitates the model transitions by instructing and controlling the execution of the models that are specified by a particular transition. The system can operate in conjunction with the model repository system described elsewhere herein, but it can also be implemented independently to facilitate model transitions in other systems. In one embodiment, this system controls or invokes the model execution engine by means of acting upon the metadata as specified by an operator. The operator could be a human or a system following a similar process as described herein.

Typical examples that may warrant the need to transition models utilizing the system described herein could include model performance deterioration, regulatory changes, analytic granularity changes (i.e., changes to the unit of analysis), changes to model data inputs (including additions, updates, or deletions), initial scoring population changes, workload management considerations, or system constraints (e.g. run-time performance, storage, availability, system load, etc.).

The process begins when the system captures model transition information from an operator in the form of metadata. The operator designates two sets of models from the model storage environment. Each set may consist of one or more models available within the repository. The first set is designated the transition-from set and must consist of only active models within the repository. Active models are models that are currently in use. The second set is designated the transition-to set and may consist of active or inactive models. Inactive models are models that are available within the model repository, but that are not currently in use. Inactive models could consist of either new models that are not currently in use or older models that were once in use or perhaps never placed into service. The transition-to set may also include one or more of the models in the transition-from set. In a simple model transition example, the transition-from set might include one old active model and the transition-to set might include one new inactive model that is intended to replace the old model. Because the system is designed to work with sets, it is possible to support far more complex specifications.

For each of the two model sets, the operator must also identify if the system should rely upon existing model invocations that are scheduled or triggered, or whether the system should invoke the model sets to begin the transition immediately. The system thus behaves as a surrogate scheduler or trigger in this context. This can be particularly useful in situations where waiting for the scheduler or trigger to invoke the models as normal could have negative material impacts or other undesired consequences for the enterprise (e.g. production defects, urgent requests, legal requests, etc.).

The operator must also supply a transition launch event, which specifies when the transition-to set should begin transitioning to the transition-from set. The transition must then be designated as active or passive. An active model transition indicates the operator's intent to invoke the model execution engine immediately at the arrival of the launch event to commence the transition. A passive model transition indicates the operator's intent is to allow normal scheduled or triggered execution of all models specified in the transition sets.

Another item of information that is supplied by the operator is the transition window, which defines the period of time passage over which the actual transition should be completed. Once model set transition information is captured, the system relies on a scheduler or similar device for quantifying the passage of time. The system waits for the launch event and then determines what is required to satisfy the transition window. It can rely upon existing scheduled executions of the models via the model execution engine or it can optionally invoke the model execution engine either directly or indirectly.

Depending upon the execution frequency of the two model sets identified in the transition metadata parameters, which could be different, the actual implications of the facilitated transition could range from being immediate and abrupt (e.g. model set A transitions to model set B immediately), or gradually over a long period of time. Because of the flexibility of the system and its ability to interact with the model repository, the system can facilitate various types of transitions. For example, the system can be used to effectively rollback errant model changes, otherwise replace old models with new models, or gradually blend models to avoid business or system impacts and interruptions that might occur if the model transitions were to happen abruptly.

The system can additionally support facilitating transitions between model sets that contain additional or different analytic units and granularities. For example, the transition-to set could include a significantly larger population of analytic units to be scored, and thus the transition could be faded in gradually by the system to avoid any disruptions. Similarly, the system can lessen the impact of model rescoring situations by ensuring that previously published units of work do not abruptly change in score or priority as the result of a transition. This is particularly useful when considered with the model event or scoring context (e.g., it might be undesirable to allow an analytic unit to be rescored if the unit's opportunity is near expiration such that the model score consumer would not have time to react to the score change).

Figure 20:
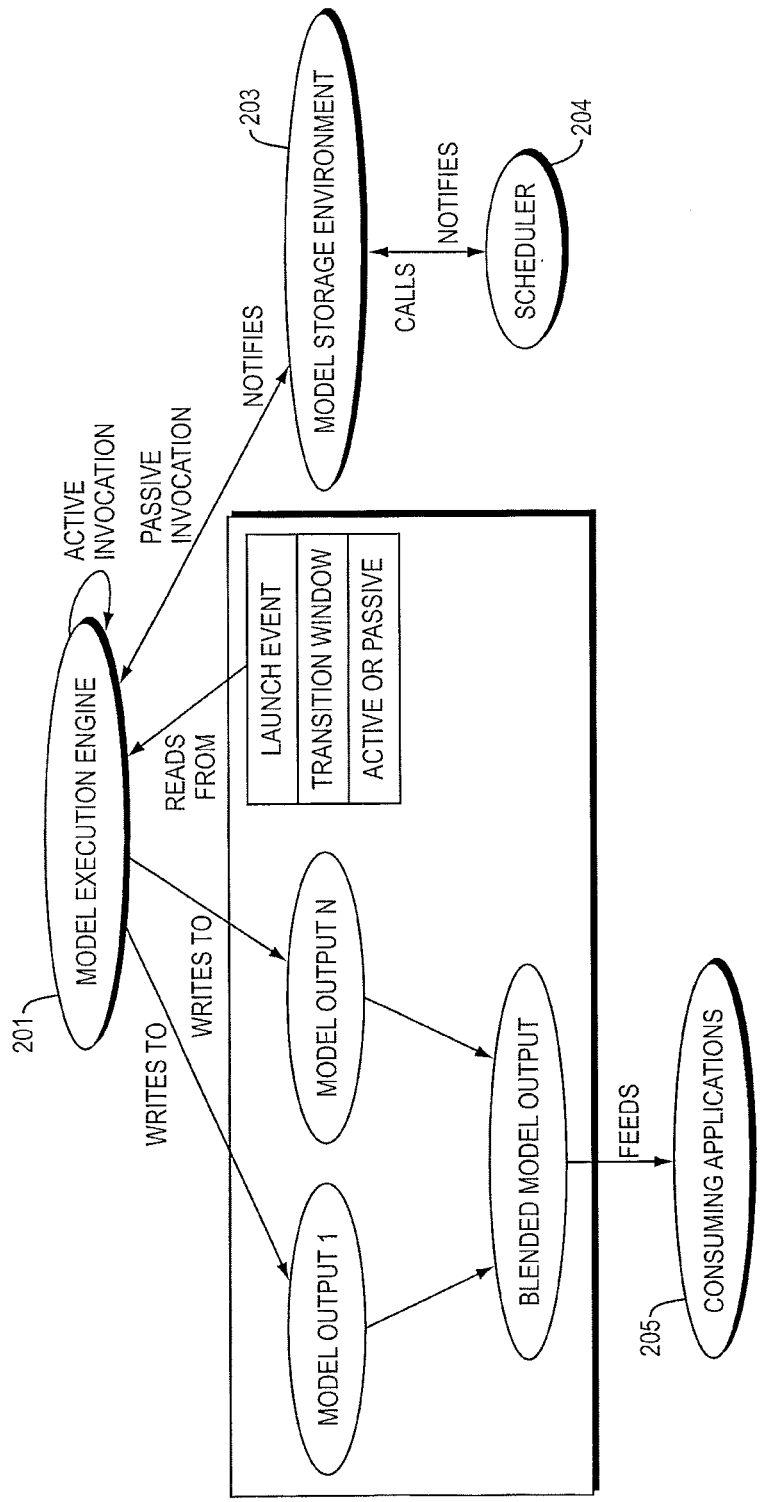
FIG. 20 illustrates an exemplary implementation and interaction among the components.

With regard to how transition is executed, there is code that resides within the overall modeling environment and interacts with the components described elsewhere herein. FIG. 20, described in more detail below, illustrates how these components interact in that context. The parameters and the model metadata are used to blend the old and new sets of models. This blending can be as smooth or lumpy, or as immediate or gradual, as desired. One of the benefits provided is the ability to blend the scoring results from the old and new sets of models over the transition window. This can be inputted along with the parameters provided by the operator. Because the system can interact directly with the model repository in the absence of the external enterprise scheduler, it can invoke the execution and drive the transitions.

Continuing with the example above regarding the OYSR model, a transition is to be made in connection with the implementation of the new OYSR model that replaced the existing OYSR model. The new model would have produced extensive business interruption because the model scoring results varied significantly from the old scoring results and work is managed based on the prioritized scores produced. The analytic units that are scored in this case were policies that had an upcoming renewal date, and that renewal date served as the "event" in the original model. Because the date for this opportunity to expire is driven by that scoring context or event date (i.e., it must be worked before the policy renewal date), individuals that work the opportunities have limited time to react to them. Of course, renewal dates are dictated by time of purchase, and thus are naturally spread out over the entire year. However, if we suddenly changed the priority on a given unit that was near expiration, it could cause, for example, changes in work behavior or impacts to operational reports that track missed high-value opportunities.

Thus, using the upcoming renewal date for the policies that were being scored along with the launch event and the transition window (45 days in this example), the new system and method effectively ran both models and blended the results based on all of the available metadata. The models were ran daily in this case (using the passive mode and relying on the enterprise scheduler) to make the transition smooth and gradual over the course of 45 days. For example, if a policy renewal occurred on the first day after the launch date of the transition, the old score would be selected and presented to avoid disruption. Similarly, if a renewal date was further into the future (in this case, at least 45 days or greater), then the mechanism would present the new score for that policy since there was ample opportunity to absorb the change, if any, between the old and new model sets.

Figure 15:
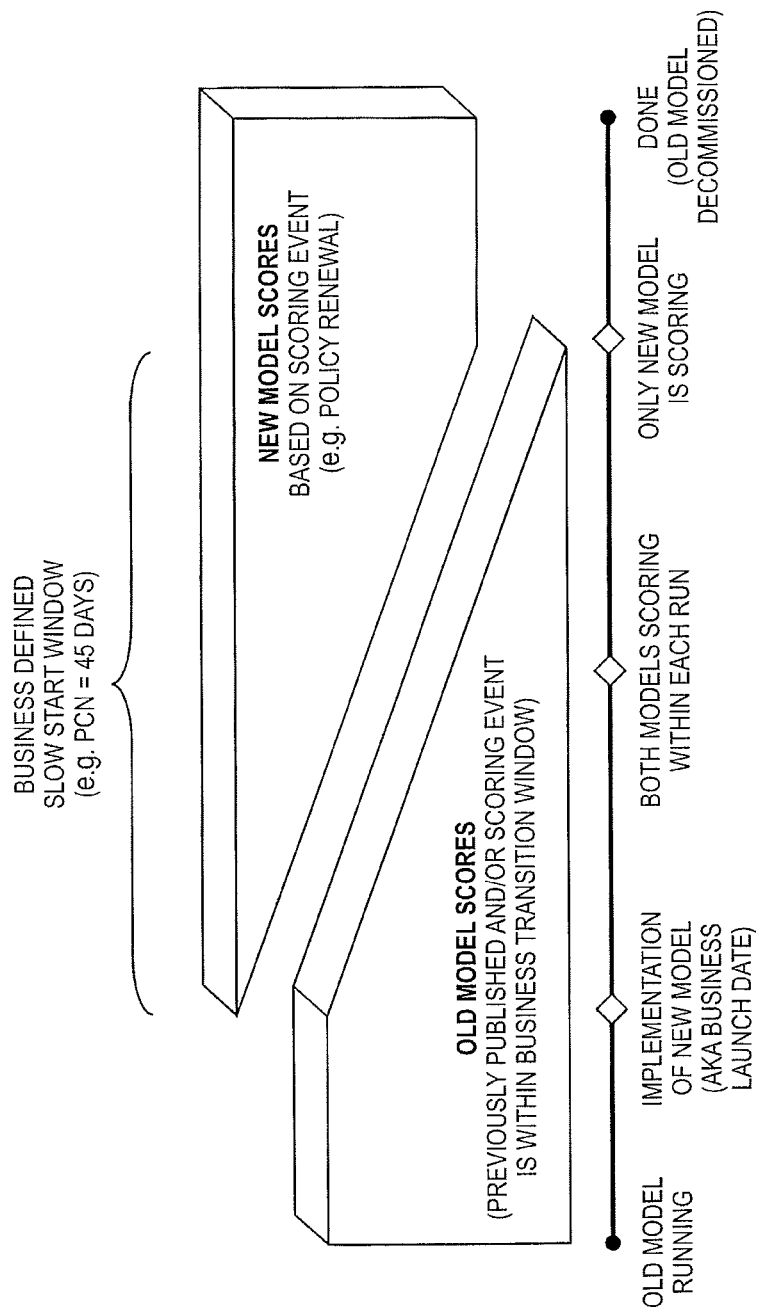
FIG. 15 is an exemplary graphical illustration of how the system can be used to transition from one set of daily models to a different set of models over a transition window.

FIG. 15 graphically illustrates how the system would be used to gradually transition from one set of daily models to a different set of models over a 45-day window.

Figure 16A:
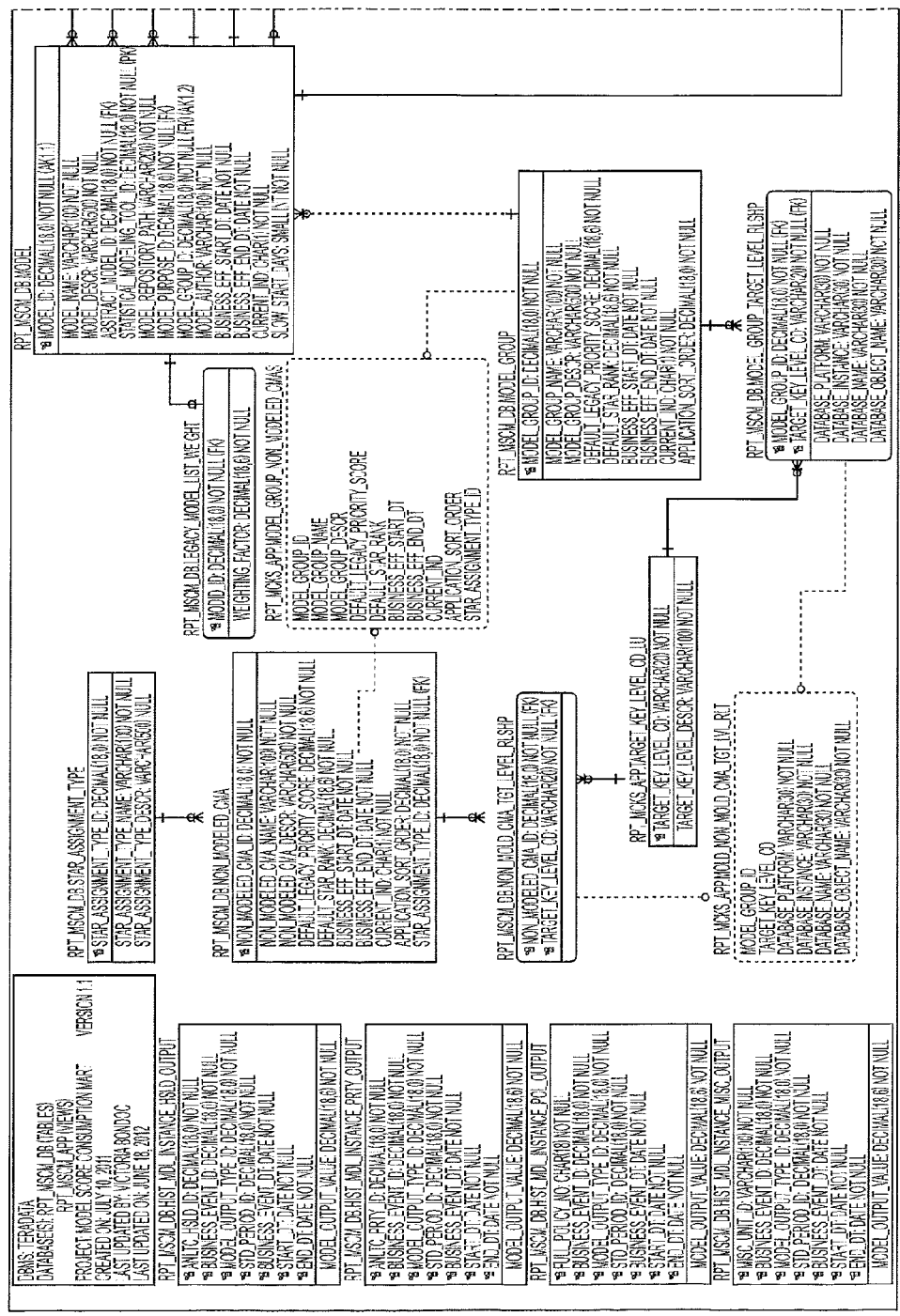
FIGS. 16A, 16B and 16C together illustrate a database table depicting metadata associated with the transition window.
Figure 16B:
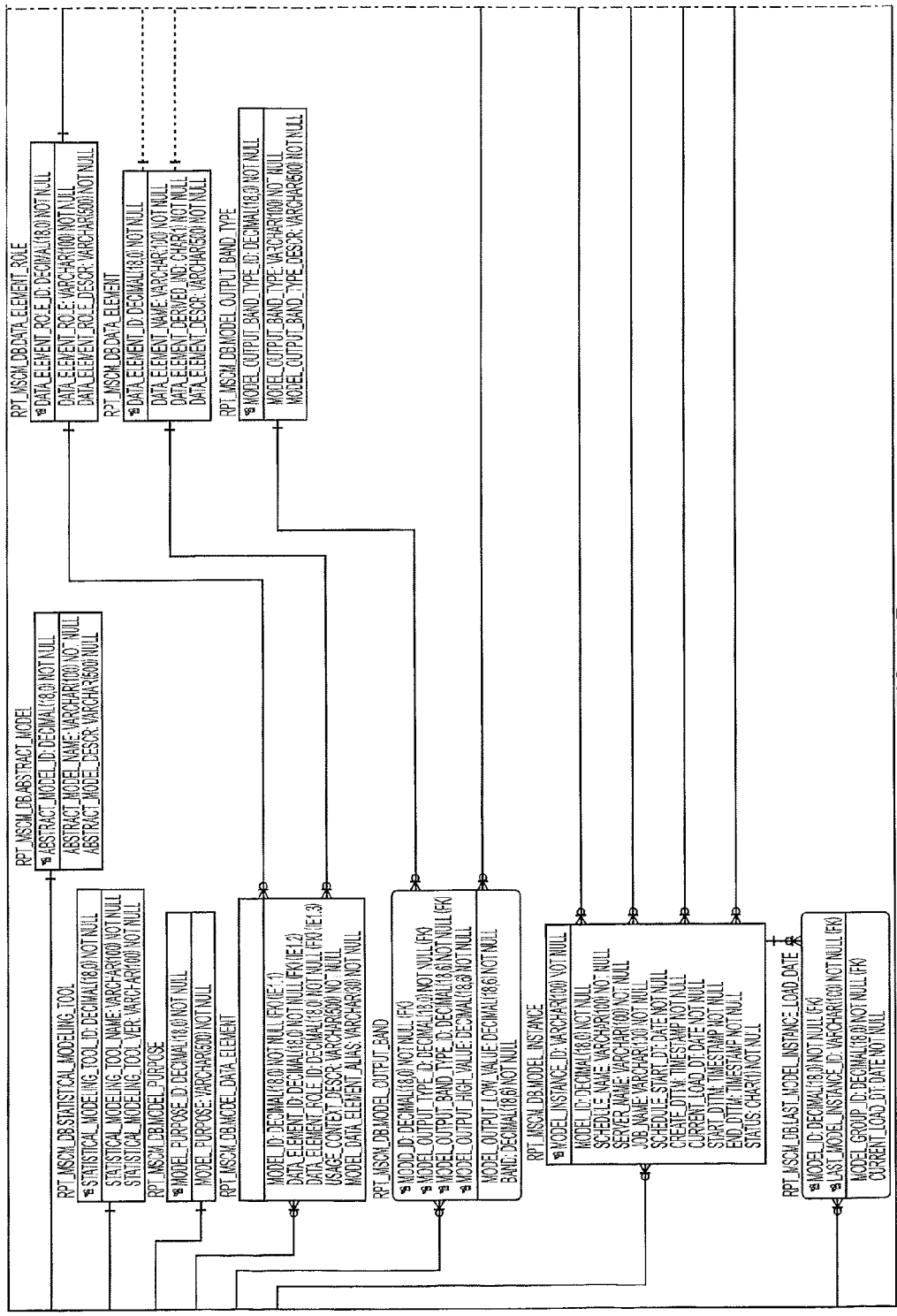
Figure 16C:
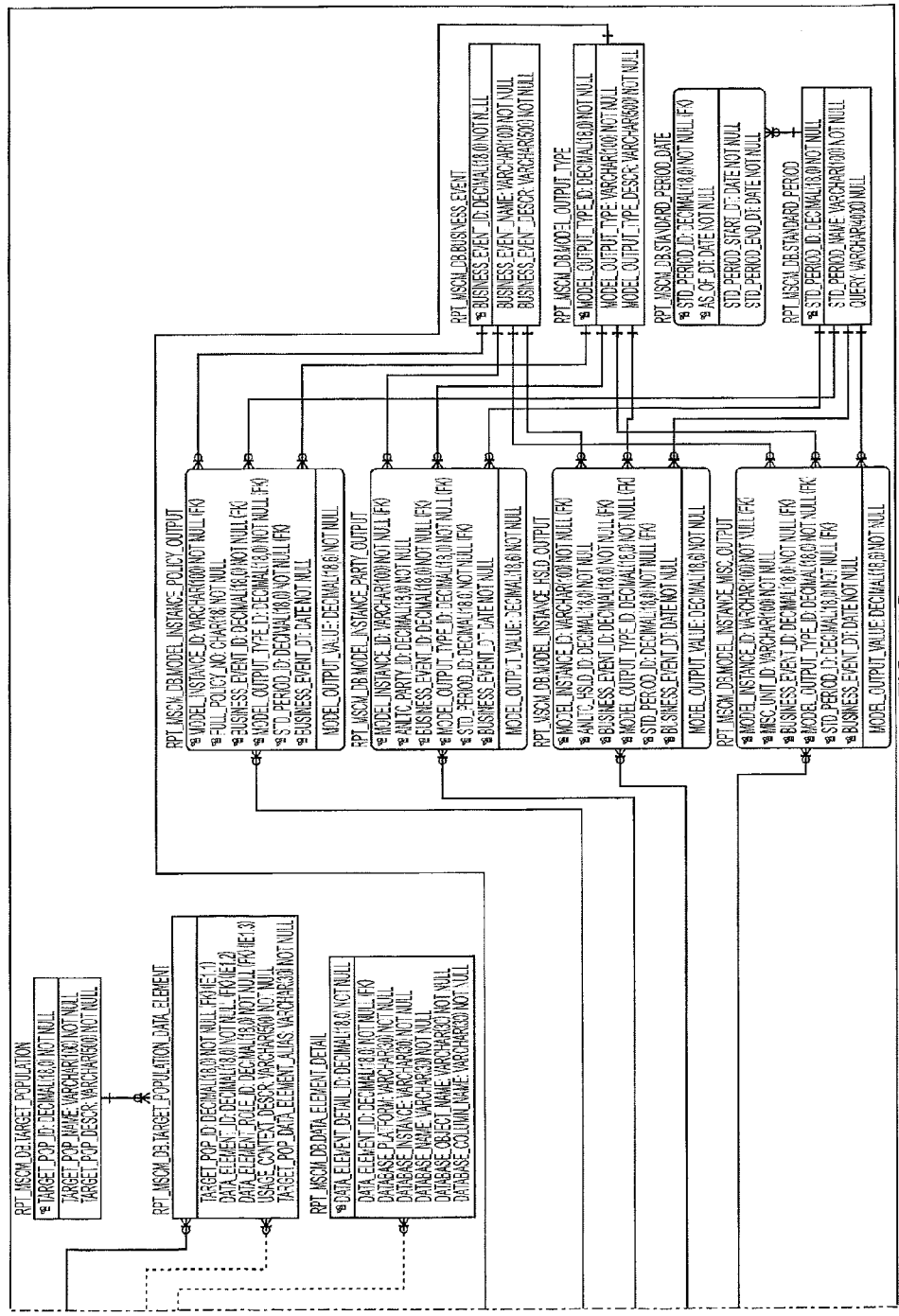

FIGS. 16A, 16B and 16C together show the Model Score Consumption Mart 308 with a modified MODEL table. The field SLOW_START_DAYS 1600 was added to capture the metadata for the transition window. For this application, the window was to be completed over 45 days.

Figure 17:
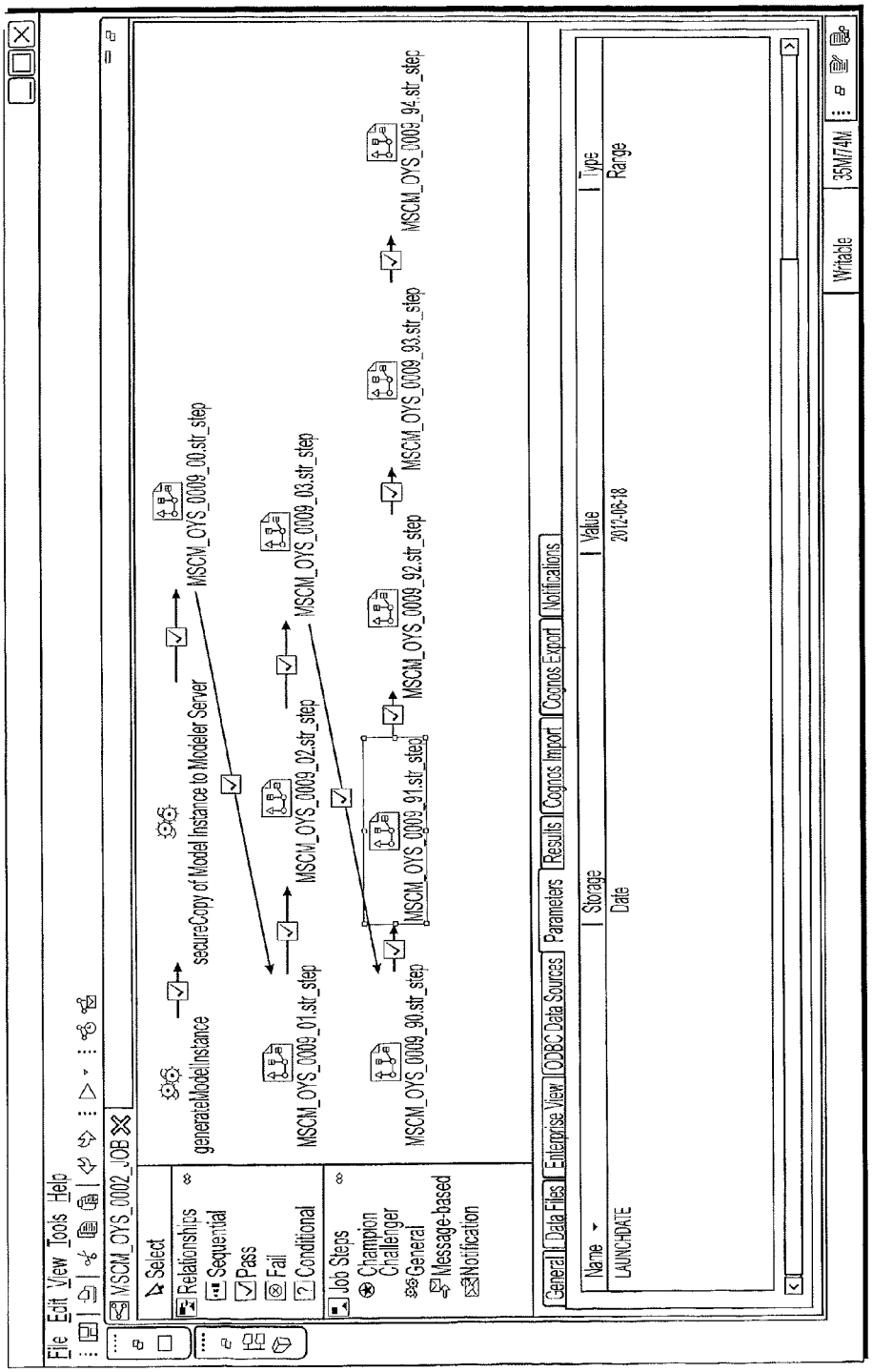
FIG. 17 illustrates aspects of an exemplary model storage environment and the application of a parameter particular to the transitioning process.

FIG. 17 depicts the model storage environment 203 and the application of a parameter, LAUNCHDATE, to the OYSR modeling job. The parameter represents the launch event concept described herein. In the example application, the parameter's value was a normal calendar date, e.g., Jun. 18, 2012.

Figure 18:
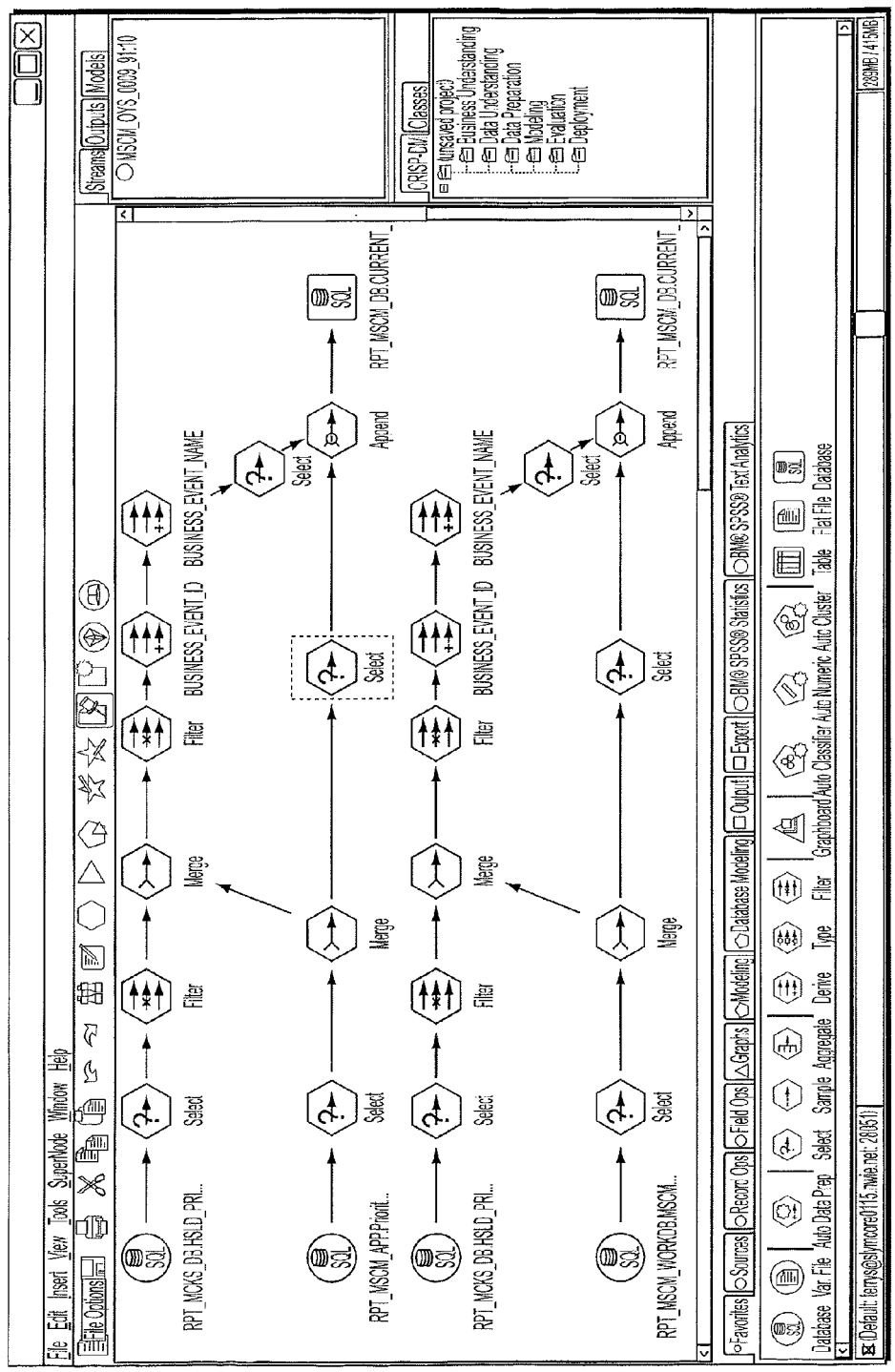
FIG. 18 illustrates an exemplary portion of the model execution instructions.

FIG. 18 depicts a portion of the model execution instructions by way of example.

Figure 19:
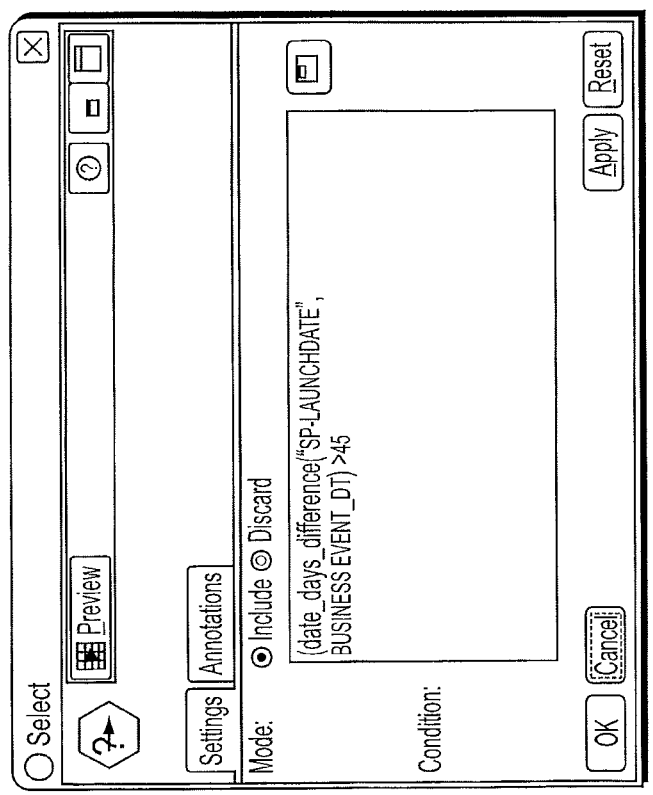
FIG. 19 illustrates conditional logic within the execution instructions to control the blending of old and new models based on the launch event.

FIG. 19 depicts conditional logic within the execution instructions to control the blending of old and new models based on the launch event, the event as described herein, and the transition window that was specified in SLOW_START_DAYS (i.e., 45).

FIG. 20 illustrates an exemplary implementation, including how the components interact. Model execution engine 201 can be invoked passively (i.e., in accordance with a schedule) or actively (i.e., by an operator). Model execution engine 201 notifies model storage environment 203 that a model is to invoked. Model storage environment 204 makes a call to scheduler 204 to determine the time parameters for the running of the model, which provides a notification in response. In connection with running the model, model execution engine 201 writes the results of the model execution as model output 1 . . . N (depending on the number of models that are being executed). The outputs of the models are blended, as described herein, and available as feeds to consuming applications 205.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

What is claimed is:

1. A computer implemented method comprising:
    storing model metadata for each of a plurality of mathematical models;
    receiving data describing two sets of models, wherein each of the sets identify one or more models of the plurality of mathematical models, and wherein one of the sets comprises a transition-from set and one of the sets comprises a transition-to set,
        wherein, when executed, each of the models in each of the sets is configured to process sets of data, each of the sets of data being associated with a data processing start date;
    receiving data describing a launch date for commencing a transition from executing the one or more models in the transition-from set to executing the one or more models in the transition-to set;
    receiving data describing a transition period of time for the transition;
    executing, using a computer processor, the one or more models in the transition-from set on the sets of data that are associated with a data processing start date that is within the transition period of time and executing the one or more models in the transition-to set on sets of data that are associated with a data processing start date that is after the transition period of time and, after the transition period of time, executing the models in the transition-to set on all of the sets of data;
    combining, using the computer processor, an output of the execution of the one or more models in the transition-from set with an output of the execution of the one or more models in the transition-to set; and
    storing the output in a database.

2. The computer implemented method of claim 1 further comprising:
    executing the models in the transition-from set on sets of data that are associated with a data processing start date that is after the transition period of time; and
    executing the models in the transition-to set on sets of data that are associated with a data processing start date that is during the transition period of time;
        wherein combining the output of the execution of the one or more models in the transition-from set with the output of the execution of the one or more models in the transition-to set comprises (a) discarding the output of the processing of the one or more models in the transition-from set on the sets of the data that are associated with a data processing start date that is after the transition period of time and (b) discarding the output of the processing of the one or more models in the transition-to set on the sets of the data that are associated with a data processing start date that is during the transition period of time.

3. A non-transitory computer readable storage medium having stored thereon computer executable instructions that, when executed on a computer, configure the computer to perform a method comprising:
    storing model metadata for each of a plurality of mathematical models;
    receiving data describing two sets of models, wherein each of the sets identify one or more models of the plurality of mathematical models, and wherein one of the sets comprises a transition-from set and one of the sets comprises a transition-to set,
        wherein, when executed, each of the models in each of the sets is configured to process sets of data, each of the sets of data being associated with a data processing start date;
    receiving data describing a launch date for commencing a transition from executing the one or more models in the transition-from set to executing the one or more models in the transition-to set;
    receiving data describing a transition period of time for the transition;
    executing the one or more models in the transition-from set on sets of data that are associated with a data processing start date that is within the transition period of time and executing the one or more models in the transition-to set on sets of data that are associated with a data processing start date that is after the transition period of time and, after the transition period of time, executing the models in the transition-to set on all of the sets of data;
    combining an output of the execution of the one or more models in the transition-from set with an output of the execution of the one or more models in the transition-to set; and
    storing the output in a database.

4. The non-transitory computer readable storage medium of claim 3 wherein the method performed by the computer further comprises:
    executing the models in the transition-from set on sets of data that are associated with a data processing start date that is after the transition period of time; and
    executing the models in the transition-to set on sets of data that are associated with a data processing start date that is during the transition period of time;
        wherein combining the output of the execution of the one or more models in the transition-from set with the output of the execution of the one or more models in the transition-to set comprises (a) discarding the output of the processing of the one or more models in the transition-from set on the sets of the data that are associated with a data processing start date that is after the transition period of time and (b) discarding the output of the processing of the one or more models in the transition-to set on the sets of the data that are associated with a data processing start date that is during the transition period of time.

5. A system comprising:
    memory operable to store at least one program; and
    at least one processor communicatively coupled to the memory, in which the at least one program, when executed by the at least one processor, causes the at least one processor to perform a method comprising the steps of:
    storing model metadata for each of a plurality of mathematical models;

receiving data describing two sets of models, wherein each of the sets identify one or more models of the plurality of mathematical models, and wherein one of the sets comprises a transition-from set and one of the sets comprises a transition-to set, wherein, when executed, each of the models in each of the sets is configured to process sets of data, each of the sets of data being associated with a data processing start date;

receiving data describing a launch date for commencing a transition from executing the one or more models in the transition-from set to executing the one or more models in the transition-to set;

receiving data describing a transition period of time for the transition;

executing the one or more models in the transition-from set on sets of data that are associated with a data processing start date that is within the transition period of time and executing the one or more models in the transition-to set on sets of data that are associated with a data processing start date that is after the transition period of time and, after the transition period of time, executing the models in the transition-to set on all of the sets of data;

combining an output of the execution of the one or more models in the transition-from set with an output of the execution of the one or more models in the transition-to set; and storing the output in a database.

6. The system of claim 5 wherein the processor is caused to perform a method further comprising:

executing the models in the transition-from set on sets of data that are associated with a data processing start date that is after the transition period of time; and executing the models in the transition-to set on sets of data that are associated with a data processing start date that is during the transition period of time;

wherein combining the output of the execution of the one or more models in the transition-from set with the output of the execution of the one or more models in the transition-to set comprises (a) discarding the output of the processing of the one or more models in the transition-from set on the sets of the data that are associated with a data processing start date that is after the transition period of time and (b) discarding the output of the processing of the one or more models in the transition-to set on the sets of the data that are associated with a data processing start date that is during the transition period of time.

\* \* \* \* \*